United States Patent
Cuomo, Jr.

(10) Patent No.: US 12,126,496 B2
(45) Date of Patent: Oct. 22, 2024

(54) NETWORK TOPOLOGY MAPPING FOR CORRECTLY CONFIGURING CLUSTERED NETWORKS

(71) Applicant: Microsoft Technology Licensing, LLC, Redmond, WA (US)

(72) Inventor: Daniel Frederick Cuomo, Jr., Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 328 days.

(21) Appl. No.: 17/583,321

(22) Filed: Jan. 25, 2022

(65) Prior Publication Data

US 2023/0239214 A1    Jul. 27, 2023

(51) Int. Cl.

| | |
|---|---|
| *H04L 12/28* | (2006.01) |
| *H04L 12/46* | (2006.01) |
| *H04L 41/0813* | (2022.01) |
| *H04L 41/0823* | (2022.01) |
| *H04L 41/0873* | (2022.01) |
| *H04L 41/0893* | (2022.01) |
| *H04L 41/12* | (2022.01) |

(Continued)

(52) U.S. Cl.
CPC .......... *H04L 41/12* (2013.01); *H04L 12/2865* (2013.01); *H04L 12/2867* (2013.01); *H04L 12/4675* (2013.01); *H04L 41/0813* (2013.01); *H04L 41/0823* (2013.01); *H04L 41/0873* (2013.01); *H04L 41/0893* (2013.01); *H04L 43/0811* (2013.01); *H04L 43/0817* (2013.01)

(58) Field of Classification Search
CPC . H04L 12/28–4695; H04L 41/02–5096; H04L 43/02–55; H04L 45/02–851; H04L 69/02–40; Y02D 30/00–50
See application file for complete search history.

(56) References Cited

U.S. PATENT DOCUMENTS

| | | | |
|---|---|---|---|
| 6,061,334 A | 5/2000 | Berlovitch et al. | |
| 6,748,429 B1 * | 6/2004 | Talluri | .................... H04L 41/12 |

(Continued)

OTHER PUBLICATIONS

"Final Office Action Issued in U.S. Appl. No. 17/125,965", Mailed Date: Aug. 5, 2022, 16 Pages.

(Continued)

*Primary Examiner* — Timothy J Weidner
(74) *Attorney, Agent, or Firm* — Holzer Patel Drennan

(57) ABSTRACT

A method for configuring and/or correcting misconfigurations within a clustered network includes determining, at each node of multiple nodes in the clustered network, configuration data that identifies a connection type between the node and at least one device connected to the node, where the connection type is either a switched or switchless connection. The method further provides for publishing the configuration data determined at each of the multiple nodes to a location mutually accessible by other nodes in the clustered network generating a map of physical network topology of the clustered network based on the published configuration data; using the map of the physical network topology to determine a correct logical layer configuration for the network; and configuring one or more aspects of the network to match the determined correct logical layer configuration.

20 Claims, 11 Drawing Sheets

(51) Int. Cl.
   *H04L 43/0811* (2022.01)
   *H04L 43/0817* (2022.01)

(56) References Cited

U.S. PATENT DOCUMENTS

| | | | |
|---|---|---|---|
| 7,796,613 | B2 | 9/2010 | Wackerly |
| 8,417,788 | B1 | 4/2013 | Ting et al. |
| 8,462,666 | B2 | 6/2013 | Subramanian et al. |
| 8,462,774 | B2 | 6/2013 | Page et al. |
| 9,148,389 | B2 | 9/2015 | Jacob Da Silva et al. |
| 9,160,565 | B2 | 10/2015 | Shukla |
| 9,647,894 | B2 | 5/2017 | Nair et al. |
| 9,929,880 | B2 | 3/2018 | Ganesan et al. |
| 10,992,526 | B1 | 4/2021 | Ali et al. |
| 11,159,377 | B2 | 10/2021 | Ramakrishnan |
| 11,171,810 | B1 | 11/2021 | Murray |
| 11,218,378 | B1 * | 1/2022 | Chaganti ............ H04L 41/147 |
| 2008/0005329 | A1 | 1/2008 | Bauman et al. |
| 2008/0270588 | A1 | 10/2008 | Sultan et al. |
| 2010/0313185 | A1 | 12/2010 | Gupta et al. |
| 2012/0294192 | A1 | 11/2012 | Masood et al. |
| 2015/0098474 | A1 | 4/2015 | Ganesan et al. |
| 2015/0277953 | A1 | 10/2015 | Xu |
| 2015/0319042 | A1 | 11/2015 | Palchaudhuri et al. |
| 2016/0156522 | A1 * | 6/2016 | Jubran ............ H04L 41/122 |
| 2018/0316594 | A1 * | 11/2018 | Wu ............ H04L 41/122 |
| 2018/0351791 | A1 | 12/2018 | Nagarajan et al. |
| 2020/0389477 | A1 | 12/2020 | Ambrosi et al. |
| 2020/0412619 | A1 * | 12/2020 | Nakamura ............ H04L 41/122 |
| 2021/0096878 | A1 | 4/2021 | Chomakov et al. |
| 2021/0243051 | A1 | 8/2021 | Wang |
| 2022/0200860 | A1 | 6/2022 | Cuomo et al. |

OTHER PUBLICATIONS

"International Search Report and Written Opinion Issued in PCT Application No. PCT/US22/050015", Mailed Date: Feb. 28, 2023, 12 Pages.

"Notice of Allowance Issued in U.S. Appl. No. 17/125,965", Mailed Date: Aug. 31, 2023, 12 Pages.

"Notice of Allowance Issued in U.S. Appl. No. 17/125,965", Mailed Date: Oct. 24, 2023, 7 Pages.

"Non Final Office Action Issued in U.S. Appl. No. 17/125,965", Mailed Date: Dec. 20, 2021, 13 Pages.

"International Search Report and Written Opinion Issued in PCT Application No. PCT/US21/057470", Mailed Date: Feb. 4, 2022, 11 Pages.

Kok, et al., "Simple IP subnet VLAN implementation", In Proceedings of Ninth IEEE International Conference on Networks, Oct. 10, 2001, pp. 160-165.

Risdianto, et al., "SmartX Box: Virtualized Hyper-Converged Resources for Building an Affordable Playground", In Journal of Electronics vol. 8, Issue 11, Oct. 30, 2019, 18 Pages.

Wiselman, et al., "Deploy a Storage Spaces Direct Hyper-Converged Cluster in VMM", Retrieved from: https://docs.microsoft.com/en-us/system-center/vmm/s2d-hyper-converged?view=sc-vmm-2019, Sep. 21, 2021, 16 Pages.

* cited by examiner

NETWORK TOPOLOGY MAPPING FOR CORRECTLY CONFIGURING CLUSTERED NETWORKS

BACKGROUND

In various settings, computing devices may be networked in small and large clusters. A cluster network refers to two or more computing devices working together for a common computing purpose. Clustered networks may take advantage of parallel processing power or share computing resources to provide scalability, high availability, and/or failover capabilities if one computing device experiences a problem.

Each node in a cluster is equipped with at least one processor and memory to support various compute and storage operations, such as workload sharing and distribution across the cluster. Configuring a cluster of computing devices includes operations to configure physical aspects of the network as well as logical aspects of the network. Configuring physical aspects of the network may, for example, include unpacking the hardware and plugging in cables to various ports to establish proper connectivity and data flow across the various devices of the physical network. Configuring logical aspects of the network includes, for example, configuring Layer-2 (Data Link layer) and Layer-3 (Network layer) aspects of the Open Systems Interconnection (OSI) model, such as to define an addressing structure used between endpoints and how packets are routed between the endpoints.

When aspects of either the physical or logical network are misconfigured, network performance may be interrupted or degraded due to connectivity issues, increased latencies, and/or increased traffic congestion (e.g., packet loss). These types of issues can be difficult to troubleshoot and may cause a user to seek assistance from tech support specialists, which can be time consuming and burdensome.

SUMMARY

Figure 1:
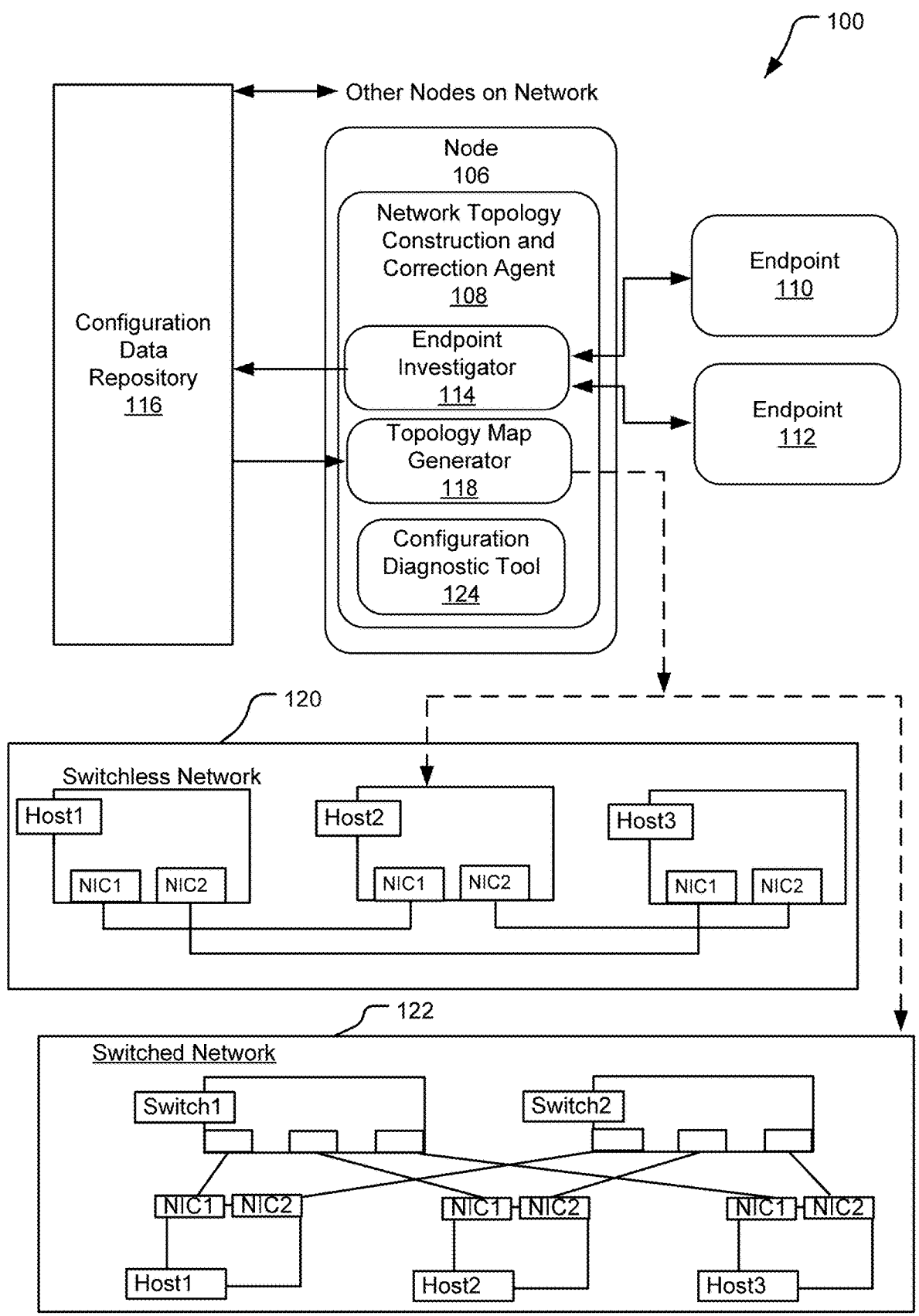
FIG. 1 illustrates an example clustered network that self-generates a map of physical network topology and that uses the physical network topology to verify and/or auto-configure logical layer aspects of the clustered network.

A method for detecting physical network topology of a clustered network to ensure accurate network configuration includes determining, at each node of multiple nodes of the clustered network, configuration data identifying a connection type between the node and each one or more other devices connected to the node, where the connection type is either a "switched connection" or a "switchless connection." The method further provides for publishing the configuration data determined at each of the multiple nodes to a location mutually accessible by other nodes in the clustered network and for generating, with a processor, a map of physical network topology of the clustered network based on the published configuration data generated by the multiple nodes. The generated map of physical network topology identifies the multiple nodes and existing connectivity channels between the multiple nodes. The method still further provides for using the map of the physical network topology to determine a correct logical layer configuration for the network and for configuring one or more aspects of the network to match the determined correct logical layer configuration.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

In clustered network systems, it is possible for network adapters to be cabled to a switch or to a network card on another node in the cluster. In switched topology systems, nodes communicate with one another through switches; in switchless topology systems, the nodes communicate directly with one another (without a switch). Some logical layer configurations of the network depend on whether the network connections are switched or switchless.

As used herein, the term "logical layer" refers to aspects of Layer-2 and Layer-3 of the OSI model including, for example, configuration of Internet Protocol (IP) subnets and Virtual Local Area Networks (VLANs). In switchless configurations, the logical mapping (e.g., IP subnet and VLAN) are unique for each pair of nodes in direct communication with one another. In contrast, switched configurations employ logical mappings that reflect the physical network topology of the network. In these configurations, devices cabled to a same switch typically all share the same IP subnet and VLAN, and different IP subnets and VLANs are used with respect to each different switch. Consequently, the "correctness" of a given logical layer configuration of a clustered system is integrally dependent upon the physical network topology of the network (e.g., how the user cables together the various network devices).

The common use of different logical layer configurations to support switched network topologies and switchless network topologies makes it difficult to automatically configure logical layer aspects of a network and also difficult to verify whether a particular network configuration is correct. As used herein, "correctness" of a network configuration refers to an agreement between the physical configurations and the logical layer configurations of a network such that there are no issues of partitioned connectivity, latency issues, or packet loss due to traffic being routed through more devices than an optimal solution (e.g., such as when a node-to-node transmits data packets through two switches rather than one) as compared to other nodes in the same cluster. For example, it may be possible to confirm that a node is configured correctly by tracking command execution times on the node and comparing those tracked execution times with the corresponding tracked information with respect to other nodes in the cluster. Notable differences in the tracked execution times on the different nodes may indicate that a worse-performing node is incorrectly configured.

In typical clustered systems, individual nodes lack the ability to determine whether they are directly connected to switches or other nodes. For this reason, the system has a limited ability to detect user-caused physical configuration errors, such as when an adapter is plugged into an incorrect port. In addition, switchless ring topologies provide for more limited connectivity between nodes than switchless mesh topologies. All of these factors create challenges in auto-configuring logical layer aspects of the network correctly as well as in verifying the correctness of existing physical and logical layer network configurations.

The herein disclosed technology provides an automated (software-based) solution for determining a physical network topology of a network and for using the determined physical network topology to identify a correct logical layer topology for the network. According to one implementation, the disclosed solution is capable of detecting the processing devices on a network, detecting the processing device types (e.g., compute nodes v. switches), determining a connection type for each node-to-node connection as being either "switched" or "switchless," and—in switchless systems— further determining whether the topology is ring-based or mesh-based. This information is used to generate a complete physical network topology map that facilitates accurate identification of the correct logical layer topology. Once identified, the correct logical layer topology can be used to autoconfigure logical layer network aspects and/or to diagnose and troubleshoot misconfigurations within the network.

FIG. 1 illustrates an example clustered network 100 that self-generates a map of physical network topology and that uses the physical network topology to verify and/or auto-configure logical layer aspects of the clustered network. The clustered network 100 includes multiple nodes, which may be understood as processing devices (e.g., servers) that each have at least one processor and memory for supporting various compute tasks of the network, such as workloads that are distributed across the different nodes. The number of nodes on the network may vary depending upon the nature and purpose of the network; however, clustered networks commonly have between two and sixteen nodes (in some cases, more than sixteen).

In the clustered network 100, a node 106 is shown to include a network topology construction and correction agent 108, which includes software or a combination of software and hardware. Although some aspects of the network topology construction and correction agent 108 may be cloud-based (e.g., stored in the cloud and/or executed by cloud-based processors), at least some other aspects of the network topology construction and correction agent 108 are executed locally on the node 106. In one implementation, a different instance of the network topology construction and correction agent 108 executes on each different node of the clustered network 100. The node 106 is connected to various endpoints 110 and 112, which may be other nodes or switches in the clustered system.

The network topology construction and correction agent 108 includes an endpoint investigator 114 (e.g., a submodule) that exchanges various information with the endpoints 110 and 112 and that uses information received throughout such exchanges to determine whether each of the endpoints 110 and 112 are other remote nodes within the clustered network 100 or switches that connect to other remote nodes. Example methodology for assessing switched versus switchless connections is discussed in detail below with respect to at least FIG. 2A.

After determining local configuration data (e.g., including whether the endpoints 110 and 112 are nodes or switches), the endpoint investigator 114 publishes the configuration data to a configuration data repository 116. The configuration data repository 116 resides in a memory location accessible to all other nodes within the clustered network 100. According to one implementation, each other node in the clustered network 100 also locally executes an instance of the endpoint investigator 114 and publishes a similar local mapping to the configuration data repository 116 such that the configuration data determined at each individual node is available to all nodes within the clustered network 100.

Using the published local mappings in the configuration data repository 116, a topology map generator 118 constructs a physical network topology map of the network. FIG. 1 shows two illustrative physical network topology maps 120 and 122 that represent physical topologies that could exist in the given example of the clustered network 100 (in different scenarios) and that could be constructed based on the information published to the configuration data repository 116, as described above, using the techniques described herein.

The physical network topology map 120 corresponds to a switchless network. This map may, for example, be constructed in a scenario where the endpoint investigator 114 determines that the endpoints 110 and 112 correspond to other nodes (hosts) that have direct connections to the node 106. In this example, the clustered network 100 has three total nodes, each of which have two network interface cards (NICs) that are coupled to NICs of the other two hosts such that there exists a mesh topology (e.g., all nodes are coupled directly to all other nodes of the system).

The physical network topology map 122 corresponds to a switched network. This map may, for example, be constructed by the topology map generator 118 in a scenario where endpoint investigator 114 determines that the endpoints 110 and 112 correspond to switches (e.g., switch1 and switch2) and when other nodes publish data describing their respective connections to the same switches.

In both of the example physical network topology maps 120 and 122, construction of the map depends on configuration data published in the configuration data repository 116 by multiple nodes in the system (e.g., "host2" and "host3") that are remote from the node 106 (e.g., "host1").

Using the generated physical network topology map (e.g., physical network topology map 120 or 122) and the configuration data published to the configuration data repository 116, a configuration diagnostic tool 124 performs actions to identify a correct logical layer configuration for the network 100. In the case of a switched system, the "correct" logical layer configuration is a configuration in which all nodes connected the same switch (e.g., switch1 and switch2) have an identical logical layer configuration. For example, all nodes connected to the same switch have the same IP subnet and VLAN. If the nodes connected to a same switch do not all share a common VLAN and IP subnet, this may indicate a misconfiguration of the physical network (e.g., the user has plugged a cable into the wrong port), which can contribute to system latencies (e.g., due to longer travel paths) and/or packet loss.

In the case of a switchless system, the "correct" logical layer configuration is a configuration in which each group of connected adapters (e.g., NIC1 on Host1 and NIC1 on Host2) communicates using a unique IP subnet and VLAN pair. If each different group of connected adapters does not have a unique IP subnet/VLAN assignment, this may result in cluster partitioning which occurs when adapters (NICs) on the same subnet cannot speak to one another.

Once the correct logical layer configuration is determined based on the detected physical network topology, the correct logical layer configuration can then be used to automatically configure the logical layer network settings, to confirm that the applied logical layer network settings are correct, or to diagnose misconfigurations within the system. For example, the user may physically cable up the network in a way that is not consistent with default or auto-populated logical network settings (IP subnet/VLAN). In other cases, the user may manually configure IP subnets and VLANs in a manner that is incorrect in view of the existing physical configurations in the network. By using the generated physical network topology map, the configuration and verification tool can diagnose and automatically correct a large number of these possible types of misconfigurations.

In the event that the configuration diagnostic tool 124 identifies one or more misconfigurations within the clustered network 100, the configuration diagnostic tool 124 may implement a remedial action to initiate correction of the diagnosed network misconfiguration. For example, the configuration diagnostic tool 124 may alert a user of a physical configuration change that can correct the problem, such as by displaying the generated physical network topology map 120 or 122 that graphically illustrates (e.g., via highlight or animation) which cable is incorrectly coupled and how the user can correct the misconfiguration. In another implementation, the configuration diagnostic tool 124 implements changes to the logical settings of the network (either automatically or with user notification/authorization) that remedy the misconfiguration issues. For example, the configuration diagnostic tool 124 may swap various IP subnet/VLAN assignments as appropriate to ensure that the logical layer configuration agrees with the physical configuration of the network.

Figure 2A:
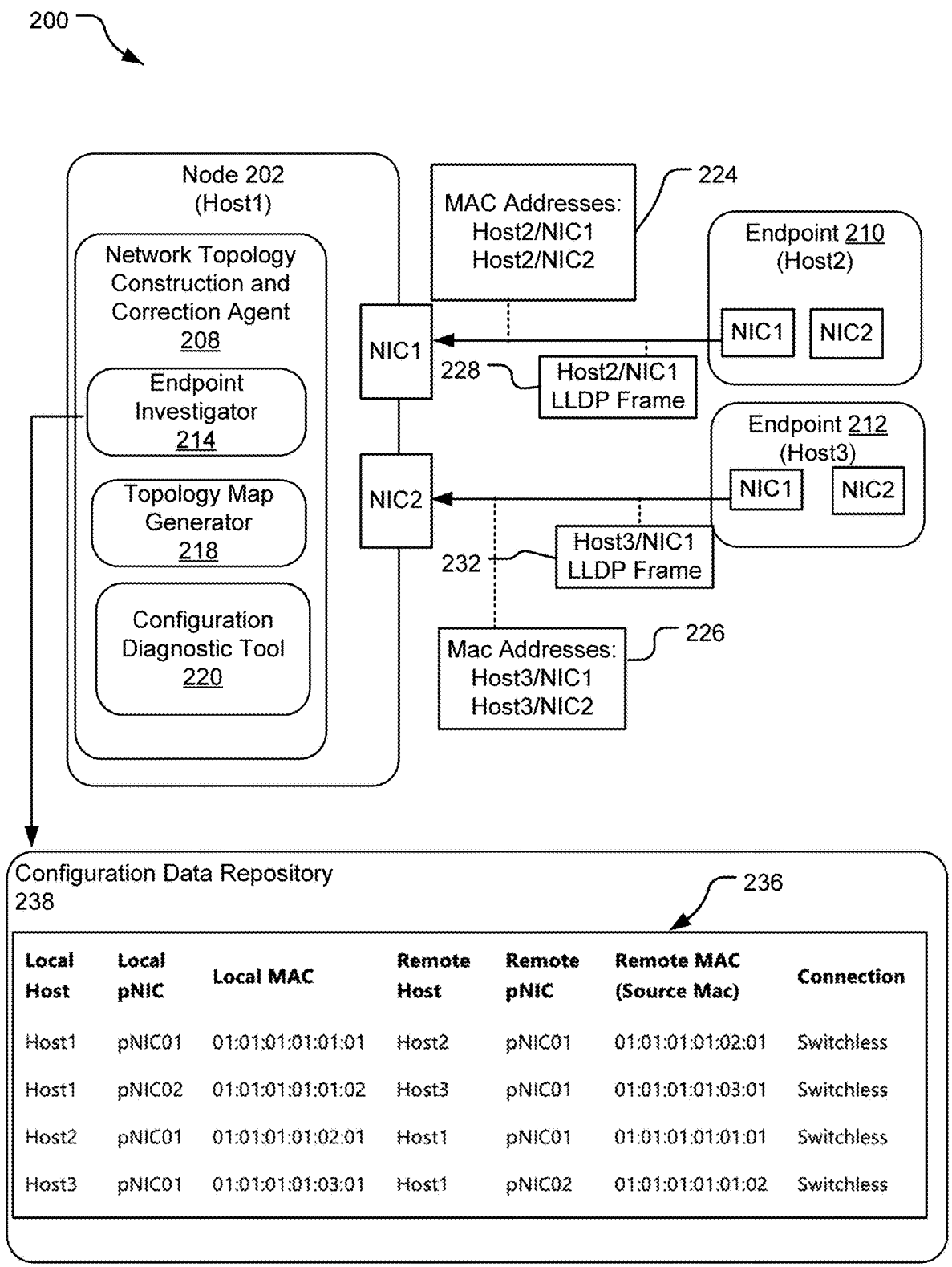
FIG. 2A illustrates example actions of a network topology construction and correction agent for detecting physical network topology of a clustered network.

FIG. 2A illustrates example actions of a network topology construction and correction agent 208 for self-detecting physical network topology within a clustered network 200. The clustered network 200 has three nodes that each locally execute a network topology construction and correction agent 208. The network topology construction and correction agent 208 includes various software components that include an endpoint investigator 214, a topology map generator 218, and a configuration diagnostic tool 220, all of which may perform actions that are the same as or similar to those of like-named components described with respect to FIG. 1. As mentioned above, certain aspects of the network topology construction and correction agent 208 are locally executed on each node of the clustered network 200. The network topology construction and correction agent 208 is generally described below with respect to a generic node 202, which corresponds to "Host1" in the notations used throughout FIG. 2A-2C.

From the node 202 (Host1), the other two nodes (Host2 and Host3) appear as endpoints 210 and 212, respectively. Initially, the node 202 does not know whether endpoints 210 and 212 are nodes or switches. The node 202 has first and second network interface controllers labeled NIC1 and NIC2, where NIC1 of the node 202 is coupled to a first NIC (also labeled NIC1) on the endpoint 210 and NIC2 of the node 202 is coupled to a first NIC (labeled NIC1) on the endpoint 212. The endpoints 210 and 212 each have a second NIC (NIC2) that is not coupled to the node 202. A complete map of the physical network topology for the clustered network 200 is shown with respect to FIG. 2B and generated by way of the actions described below with respect to FIG. 2A-2B.

To discover the types of devices corresponding to the endpoints 210, 212 (e.g., nodes or switches), the endpoint investigator 214 obtains certain information from each of the devices in its own cluster (e.g., visible endpoints 210 and 212). In one implementation, the endpoint investigator 214 obtains MAC addresses that are on each of the endpoints (e.g., 210 and 212). For example, the node 202 may run a "Get-NetAdapter" command on the endpoint 210 retrieve a list of MAC addresses 224 identifying the network interface controllers (NICs) on the endpoint 210. If the endpoint 210 is a node (as in the illustrated example), the received MAC addresses 224 correspond to the NICs on that node. In contrast, if the endpoint 210 is a switch, the Get-NetAdapter command returns the MAC addresses of NICs on nodes accessible through the switch.

After retrieving the MAC addresses from the endpoint 210, the node 202 runs the same "Get-NetAdapter" command to retrieve a list of the MAC addresses on the endpoint 212. In the illustrated scenario, the node 202 (Host1) receives MAC addresses 224 for each of the two NICs on the endpoint 210 (Host2) and MAC addresses 226 for each of the two NICs on endpoint 212 (Host3). At this point, the node 202 still does not have enough information to determine whether or how it is connected to the adapters (NICs) corresponding to the MAC addresses 224, 226 that it is has received.

The endpoint investigator 214 may then also enable Link Layer Discovery Protocol (LLDP)(IEEE 802.1AB) on each adapter with which it is in communication. When LLDP is enabled in an operating system for a specific adapter (e.g., NIC), the protocol sends and receives an LLDP frame (e.g., an LLDP frame 228) that contains certain information from the LLDP-enabled adapter. Specifically, the LLDP frame includes a chassis ID for the adapter and a port ID for the adapter.

Thus, once LLDP is enabled on the endpoint 210, the node 202 may intercept an LLDP frame 228 from NIC1 of the endpoint 210. Likewise, enabling LLDP on the endpoint 212 allows the node 202 to intercept an LLDP frame 232 from NIC1 on the endpoint 212.

For each LLDP frame received, the endpoint investigator 214 extracts the port ID and determines whether the port ID matches any one of the MAC addresses 224, 226 that was received from the endpoints 210, 212 responsive to running the Get-NetAdapter commands. If the port ID matches one of the received MAC addresses, the endpoint investigator 214 determines that the associated adapter (NIC) belongs to a node that is switchlessly connected to node 202 (Host1). In contrast, if the endpoint investigator 214 of Host1 determines that the port ID in a received LLDP frame includes an address that does not match any of the received MAC addresses 224 or 226, the endpoint investigator 214 may infer (based on this and/or in combination with other information) that the LLDP frame was sent from a switch.

In FIG. 2A, the endpoint investigator 214 assembles the configuration data (e.g., MAC addresses 224, 226 and LLDP frames 228, 232) obtained from the endpoints 210 and 212 and/or inferred from the comparison of the LLPD frame's port ID to the MAC addresses 224, 226 in a table 236 that is, in turn, published to a configuration data repository 238 accessible by all nodes in the clustered network 200. In various implementations, the configuration data in the configuration data repository 238 is published in different ways. In one implementation, the configuration data is published to a cluster database for cluster-wide awareness. In another implementation, the configuration data is published to node event logs for remote retrieval.

Exemplifying the above-described scenario, the first line of the table 236 indicates that NIC1 of Host1 is switchlessly connected to NIC1 of Host2. The second line of the table 236 indicates that NIC2 of Host 1 is switchlessly connected to NIC1 of Host3. The remaining two lines in the table represent the reverse of the first two lines (e.g., communications inbound to Host1 rather than outbound). Notably, NIC2 of Host2 and NIC2 of Host3 do not appear in the table 236. Although Host 1 has obtained MAC addresses for these adapters, Host 1 has not identified a direct connection (e.g., switched or switchless) to either of them.

When the above-described actions of the endpoint investigator 214 are performed at the other cluster nodes—Host2 and Host3—the table 236 is further updated to include the respective information from those nodes. A more complete version of this table reflecting information from each of the three nodes is shown in FIG. 2B.

Figure 2B:
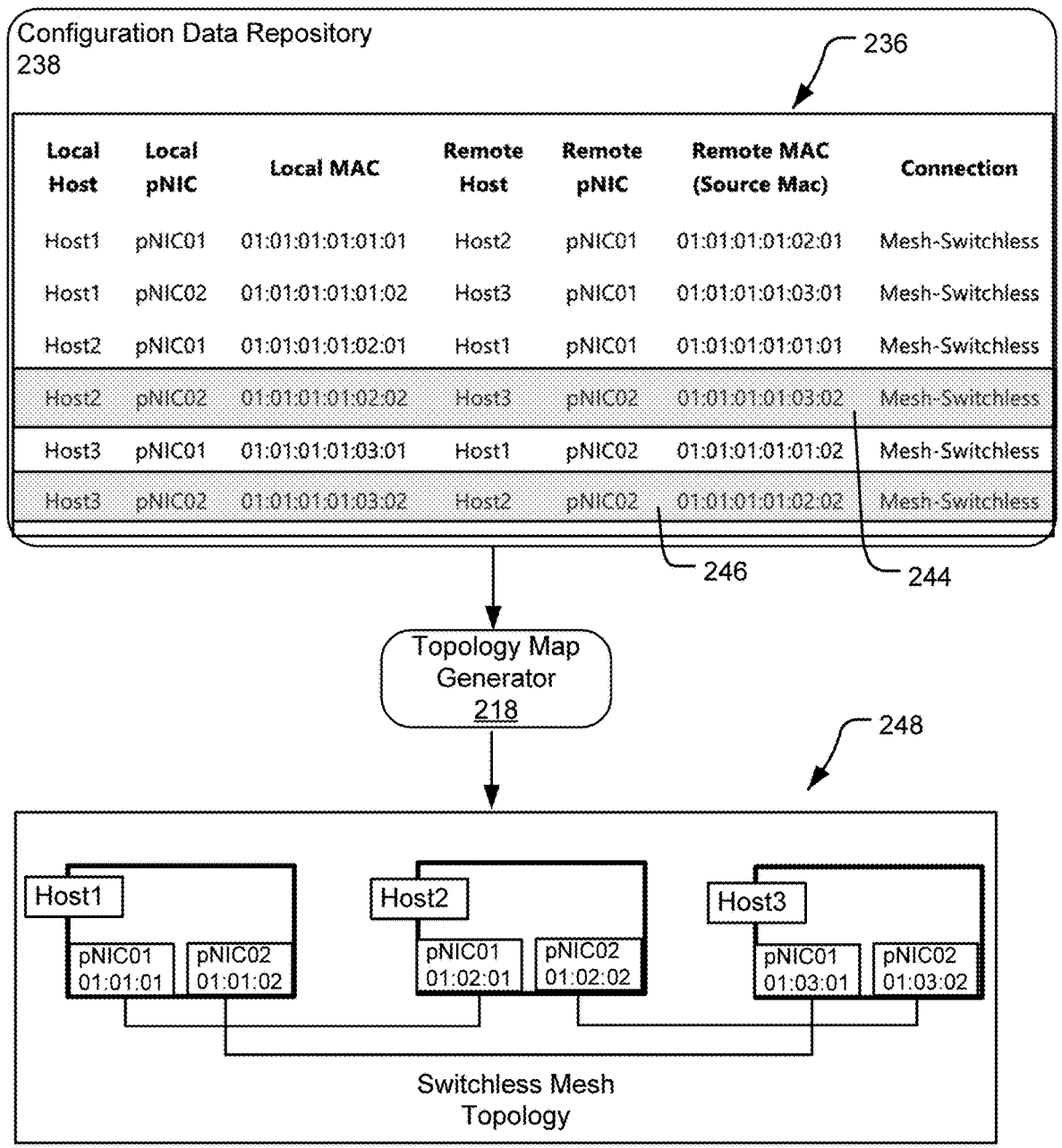
FIG. 2B illustrates further example actions of the network topology construction and correction agent of FIG. 2A that include generating a map of physical network topology.

FIG. 2B illustrates the table 236 from FIG. 2A after it has been updated by the endpoint investigator(s) in the other cluster nodes (Host2 and Host3) to include the same type of configuration data obtained at such nodes as described above with respect to Host1. The table 236 in FIG. 2B is the same as in FIG. 2A, but additionally reflects new lines 244 and 246. The new line 244 reflects that NIC2 of Host2 is switchlessly connected to NIC2 of Host3 and the new line 246 indicates the reverse of this communication channel.

From the completed table in FIG. 2B, it can be observed that every Host in the system is capable of bidirectional communication with every other host in the system. This indicates that the network is a mesh topology rather than a ring topology (which is discussed below with respect to FIG. 3). Upon completion of the table 236, the endpoint investigator 214 of any of the nodes may analyze the table 236, identify the existence of the mesh topology based on the connections in the table, and update the "connection type" field, as shown.

Using the configuration data in the table 236 that is accessible to all nodes in the system, the topology map generator 218 of any one of the system nodes is able to generate a topology map 248 illustrating all hosts, adapters, and connectivity channels between the adapters in the network. This topology map 248 may be used by a configuration diagnostic tool (e.g., configuration diagnostic tool 220 of FIG. 2A) to verify accuracy of the network configuration as well as to diagnose and correct misconfigurations of the network.

Figure 2C:
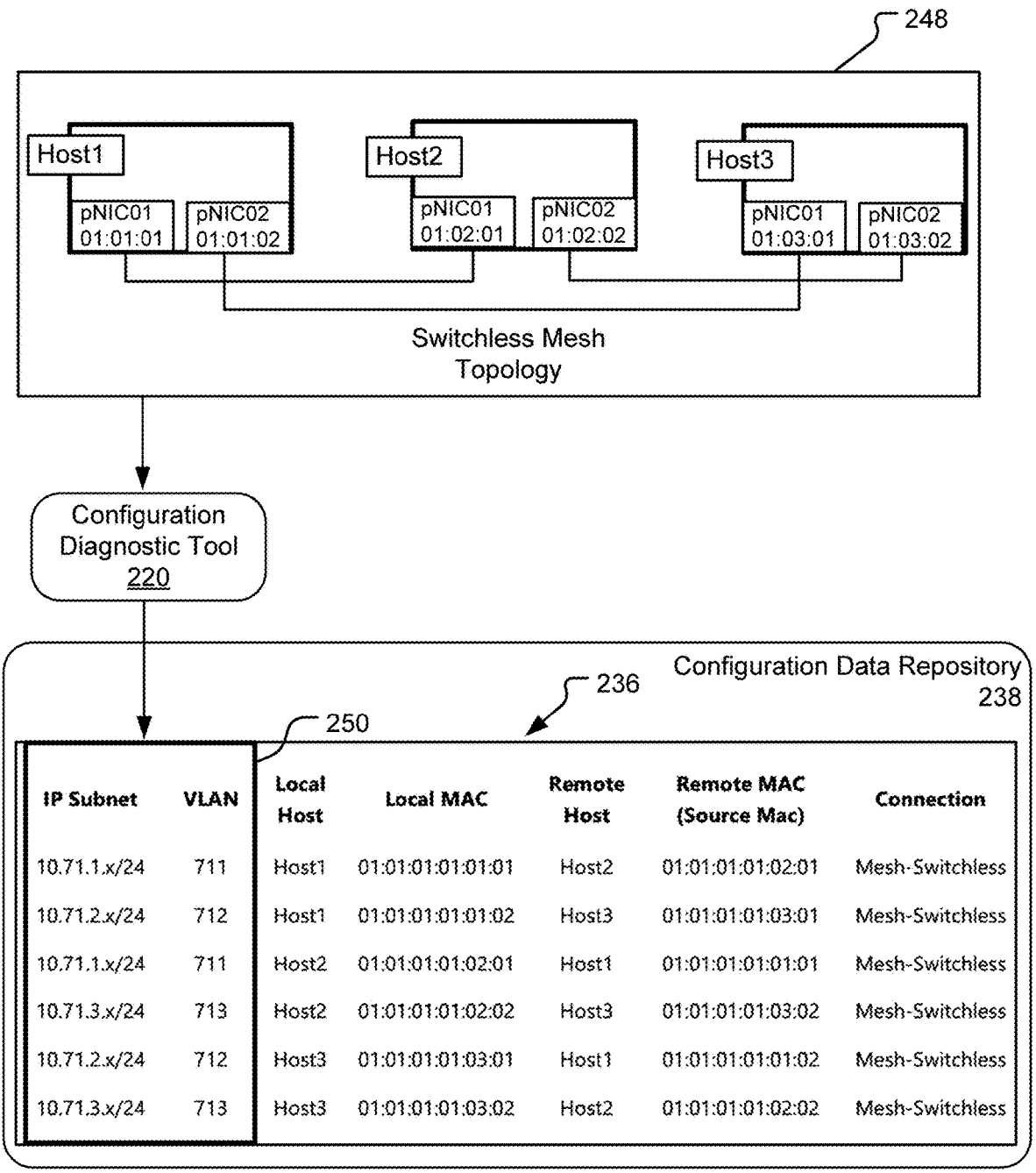
FIG. 2C illustrates further example actions of the network topology construction and correction agent of FIG. 2A and FIG. 2B that include using the map of physical network topology to configure a logical layer of the clustered network.

FIG. 2C illustrates how the topology map 248 of FIG. 2B can be used to automatically configure a logical layer of the clustered network 200 shown and described with respect to FIGS. 2A and 2B. Using the generated topology map 248, the configuration diagnostic tool 220 of any given host (e.g., host1, host2, host3) can automatically configure the associated host in a full-mesh topology ensuring that proper subnets are configured without causing cluster partitioning, which occurs when adapters on the same layer-3 subnet cannot speak to one another.

In a full-mesh topology (which is switchless, by definition), the logical mapping (IP subnet and VLAN) is unique for each pair of nodes in direct communication. In one implementation, the configuration diagnostic tool 220 automatically configures logical network settings 250 based on the topology map 248. Notably, the topology map 248 represents the actual (detected) physical configuration of the system which may differ from an expected or intended configuration. Configuring the IP Subnets and VLANs based on the detected, rather than the expected configuration, ensures agreement between the physical and logical layer configurations of the network.

In some implementations, such as systems that allow the user to manually configure the logical network settings 250, the configuration diagnostic tool 220 performs actions to verify that the logical layer configurations of the network are correct in view of the physical configurations reflected by the topology map 248. When misconfigurations are diagnosed, the configuration diagnostic tool 220 may automatically reconfigure the system to correct the configuration errors (e.g., if such a correction can be accomplished by altering logical layer settings) and/or alert a user of an action that can be manually performed to fix the misconfiguration.

Figure 3:
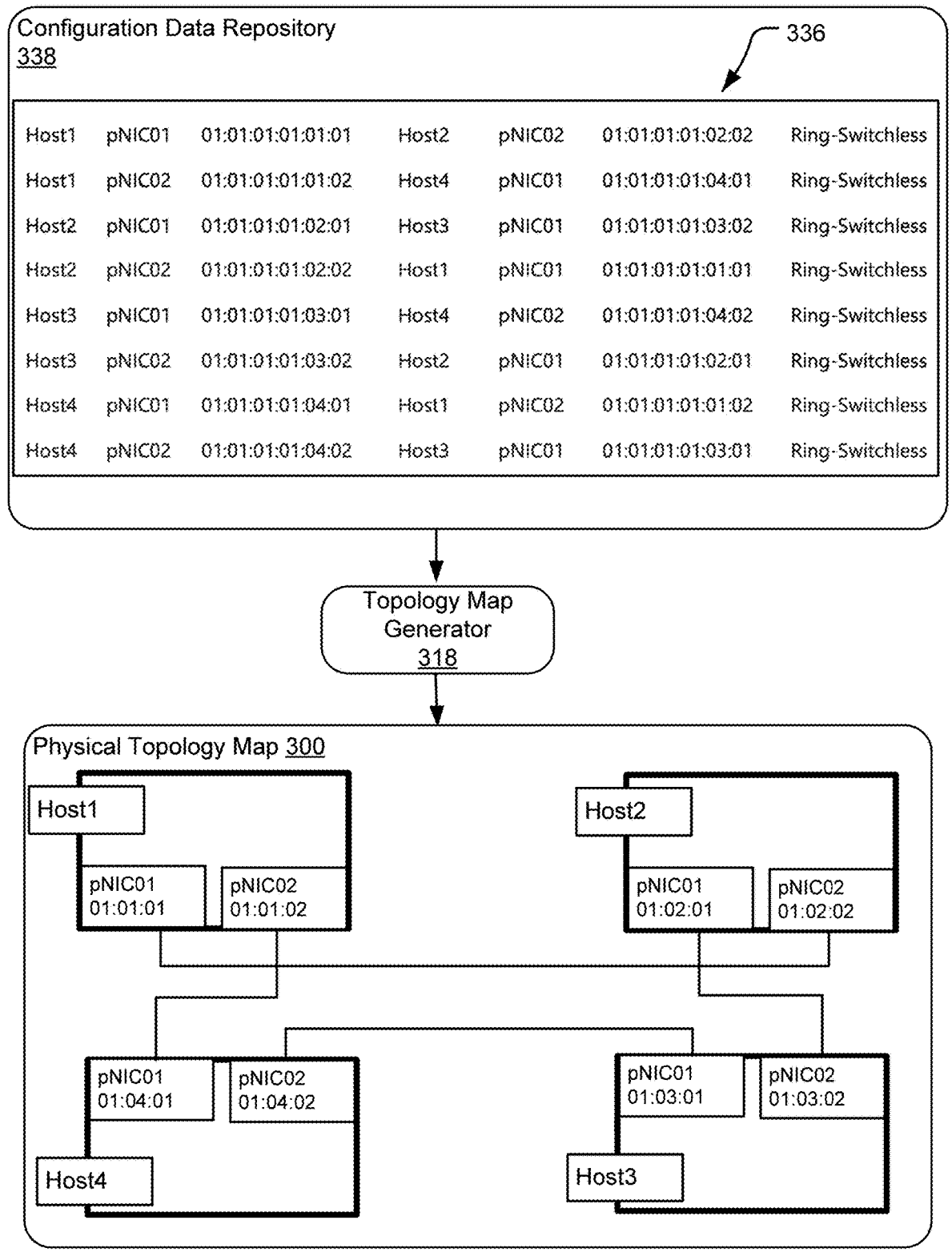
FIG. 3 illustrates an example physical network topology map of a clustered network.

FIG. 3 illustrates another example physical network topology map 300 generated by a topology map generator 318. In one implementation, the topology map generator 318 is a submodule of a network topology construction and correction agent that is executed on a node of a clustered network, as discussed above with respect to FIGS. 1 and 2A-2C. The physical network topology map 300 is generated based on configuration data collectively determined by the cluster nodes (not shown) and published to a configuration data repository 338 that is accessible to all of the nodes in the cluster. In this example, information in the configuration data repository 338 is determined and published in the same or similar manner to that described with respect to any of FIG. 2A-2C.

Unlike the example of FIG. 2B, the table 336 does not indicate that each node is switchlessly connected to every other node. Although the table 336 indicates that Host1 is connected to Host2 and Host4, there is no table entry that is indicative of a connection between Host1 and Host3, or between Host2 and Host4. This is characteristic of a ring-topology system. Based on the configuration data in the table 336, a topology map generator 318 maps out the node-to-node connections described in the table 336 to generate the topology map 300 that shows a ring topology.

As described with respect to the topology map 248 of FIGS. 2B and 2C, the topology map 300 can be used by a configuration diagnostic tool to automatically configure logical network settings to achieve Layer-2 and Layer-3 logical network separation and/or to verify correctness of an existing logical layer network configuration. As described elsewhere herein, the "correct" logical layer configuration of a switchless topology system is one with a unique IP subnet and VLAN assignment for each pair of nodes that are in direct communication, as this prevents cluster partitioning (which occurs when adapters on the same Layer-3 subnet cannot speak to one another).

Figure 4A:
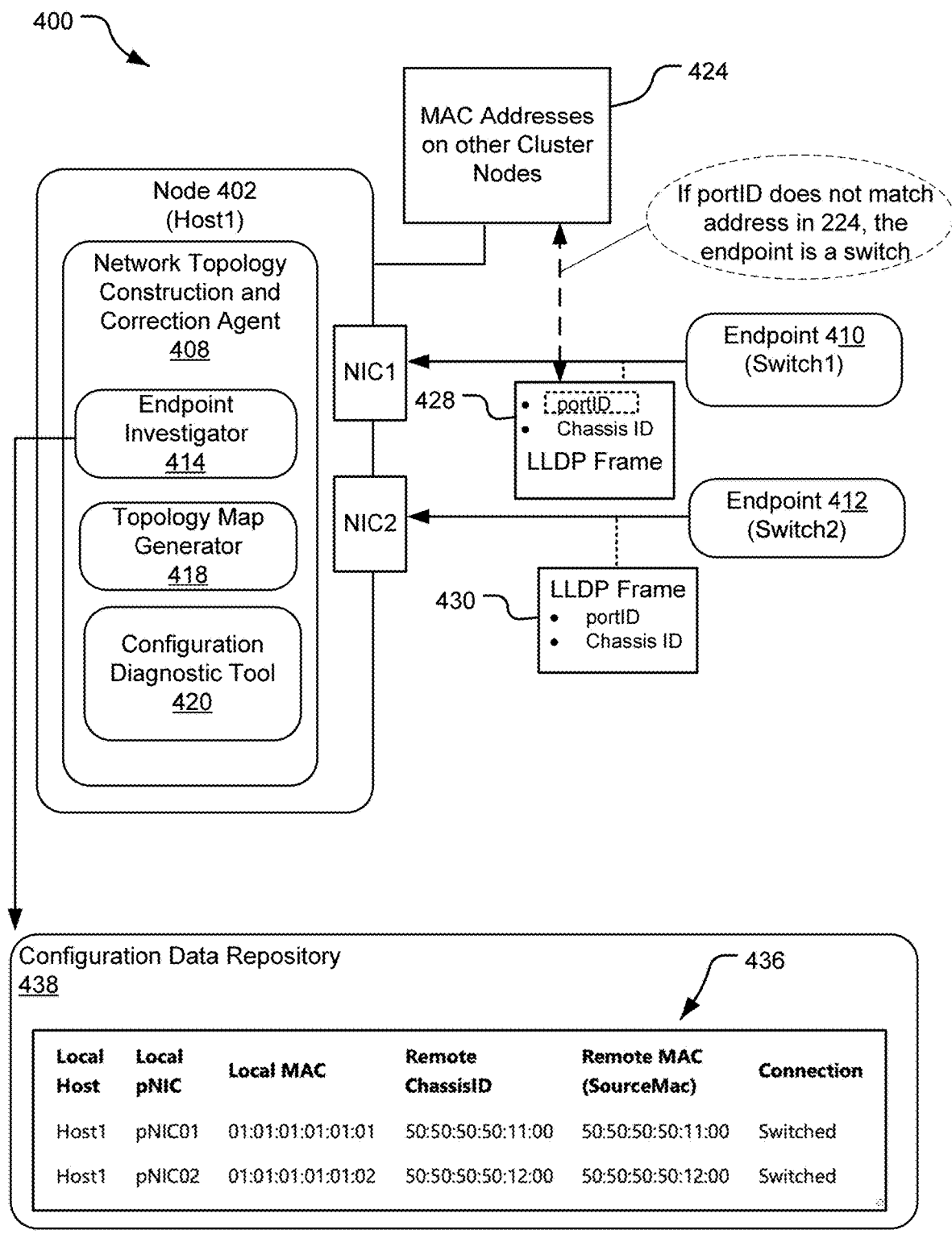
FIG. 4A illustrates example actions of a network topology construction and correction agent with respect to another type of clustered network.

FIG. 4A illustrates example actions of a network topology construction and correction agent 408 with respect to another type of clustered network 400. The clustered network 400 has the same number of nodes as the example of FIG. 2A-2C but differs in that the clustered network 400 is "switched" rather than "switchless," meaning that there exists a switch between each pair of nodes. In FIG. 4A, Switch1 and Switch 2 are labeled as endpoints 410 and 412, respectively, of a node 402 (Host 1).

The node 402 locally executes a network topology construction and correction agent 408 with various submodules including an endpoint investigator 414, a topology map generator 418 and a configuration diagnostic tool 420, each of which perform functions the same or similar to the functionality described with respect to other like-named components described herein. Initially, the node 402 does not have enough information to determine whether the endpoints 410 and 412 are nodes or switches. The endpoint investigator 414 requests, from each of its visible endpoints 410 and 412, a list of MAC addresses accessible on those endpoints. For example, the endpoint investigator 414 executes a Get-NetAdapater command on each of the endpoints 410 and 412 to retrieve the MAC addresses on each of those endpoints, which are in turn compiled on a MAC address list 424. In this example where the endpoints 410 and 412 are switches rather than nodes, execution of the Get-NetAdapter command returns MAC addresses corresponding to adapters that are directly coupled to each switch.

The endpoint investigator 414 of the node 402 enables LLDP on the adapter that it is in communication with on each of the respective endpoints 410 and 412. In response, the node 402 begins receiving LLDP frames 428 and 430 from the endpoints 410 and 412, respectively. Notably, enabling LLDP in a switchless topology (as in FIG. 2B) always results in transmission and receipt of LLDP frames as shown in FIG. 2A and FIG. 4A. However, in switched topology systems (as in FIG. 4A), enabling LLDP may or may not result in transmission and receipt of the LLDP frame. If, therefore, the endpoint investigator 414 enables LLDP on its visible endpoints but does not receive LLDP frames in response, this is a strong indicator that the network has a switched topology.

In FIG. 4A, the node 402 receives LLDP frames 428, 430 from the endpoints 410 and 412 and therefore cannot immediately determine that the endpoints are switches. Instead, the endpoint investigator extracts a port ID from each LLDP frame 428 and 430. If the port ID extracted does not match any of the MAC addresses in the list 424 (e.g., the mac addresses of other cluster nodes), the endpoint investigator 414 determines that the corresponding endpoint is a switch. In some implementations, the endpoint investigator 414 additionally or alternatively assesses whether the chassis ID or port ID from the LLDP frame matches an organizationally unique identifier (OUI) as the interface receiving the frame. The OUI is part of a MAC address specific to a particular company that may use the device. If the chassis ID and port ID do not match this OUI, the endpoint investigator determines that the corresponding endpoint is a switch.

Once the endpoint investigator 414 determines that a particular endpoint is a switch, a local mapping can be generated. For example, the endpoint investigator may publish certain configuration data such as that shown in configuration data repository 438, where the chassis ID obtained in the LLDP packet for each endpoint is also the MAC address of the switch. As before, a cluster-wide topology can be ascertained by sharing the topology list generated on a single node with other nodes in the cluster (e.g., by storing the configuration data repository at a location accessible by all other nodes).

Figure 4B:
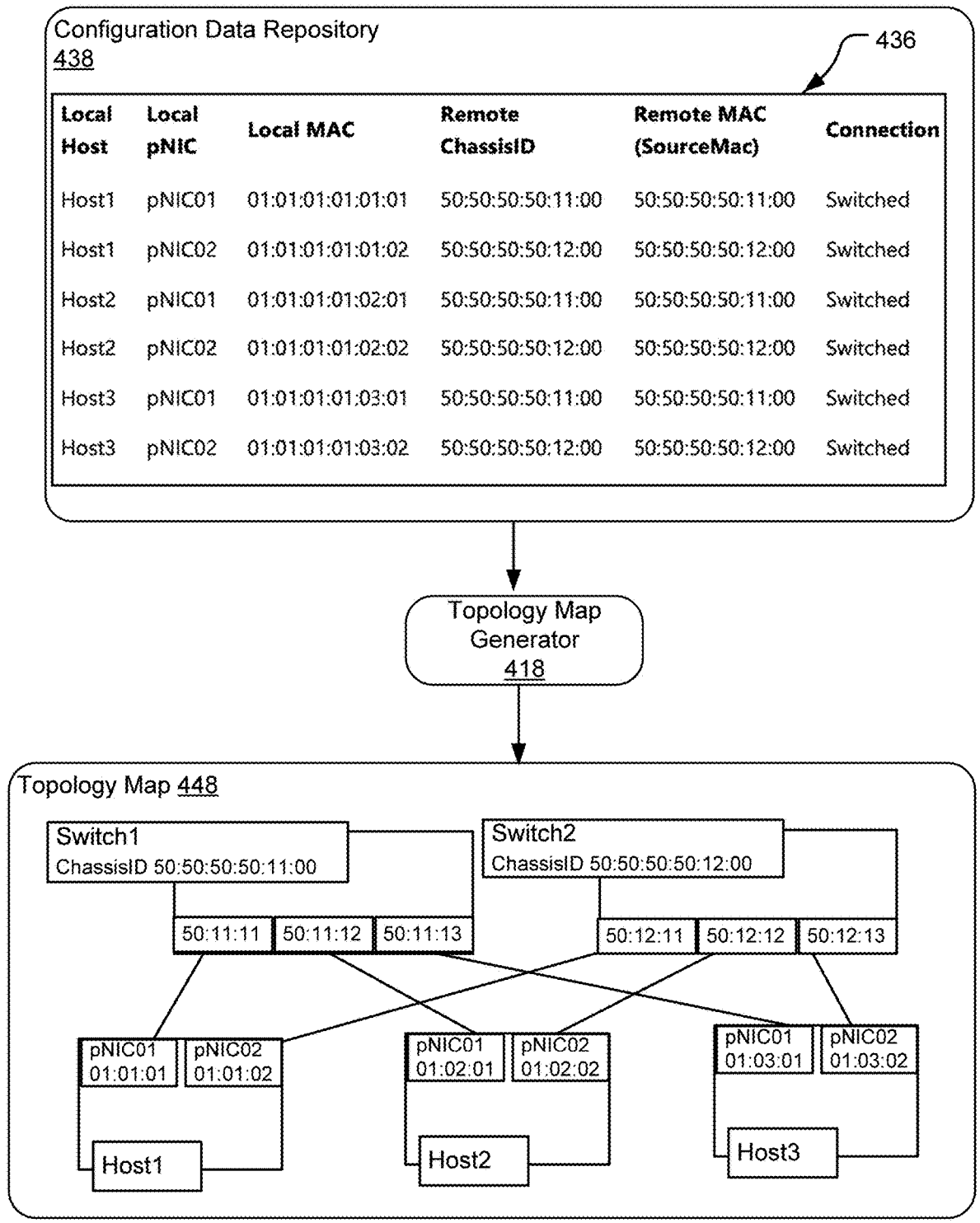
FIG. 4B illustrates an example physical network topology map generated by the network topology construction and correction agent of FIG. 4A.

FIG. 4B illustrates a physical network topology map 448 that has been generated by the topology map generator 418 of FIG. 4A based on configuration data generated by each node in the cluster. Specifically, FIG. 4B shows the table 436 in the configuration data repository 438 after the table has been updated to include local mappings from Host2 and Host3, which are determined using methods similar to the local mapping described with respect to Host1 (node 402) and FIG. 4A.

Notably, node adapters connected to a common switch are associated in the table 436 with a common chassis ID. Thus, the locally-mapped connections added to the table 436 by each node in the network are collectively sufficient to allow the topology map generator 418 to generate the topology map 448, which visually depicts the physical configuration of the network including the network nodes, adapters, switches, and connectivity channels between the various adapters and switches.

Although the topology map 448 provides a complete view of the physical network, more information is needed to verify "correctness" of this configuration. As described elsewhere herein, a correct logical layer configuration for a switched topology network ensures that all nodes connected a same switch (e.g., switch1 and switch2) have the same IP subnet and VLAN. In a system with the physical network topology shown by the topology map 448, the logical layer of the network is considered to be configured correctly when all of the NICs coupled to switch1 share a first IP subnet/VLAN pair and all of the NICs coupled to switch2 share a second IP subnet/VLAN pair.

Figure 4C:
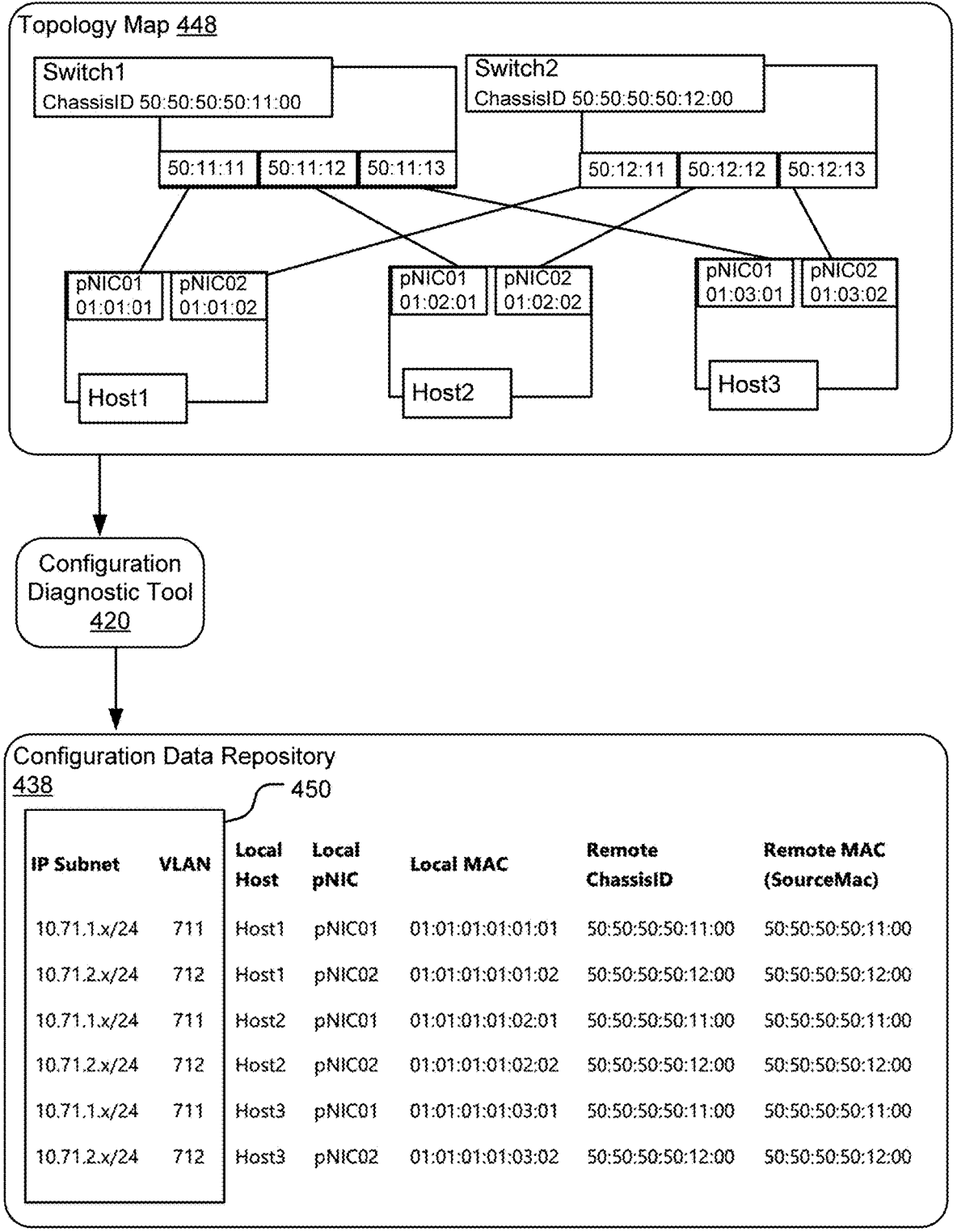
FIG. 4C illustrates example actions for using the physical network topology map of FIG. 4B to automatically configure a logical layer of the clustered network shown and described with respect to FIG. 4A and FIG. 4B.

FIG. 4C illustrates actions for using the topology map 448 of FIG. 4B to automatically configure a logical layer of the network shown and described with respect to FIGS. 4A and 4B. Using the generated topology map 448, the configuration diagnostic tool 420 of any given host (e.g., host1, host2, host3) can automatically configure the logical layer of the network to ensure a correct switched topology. As described above, e.g., with respect to FIG. 4B, the logical layer of a switched topology system is considered to be correctly configured when nodes coupled to a common switch share a common IP subnet and VLAN that are different from the IP subnet and VLAN used with respect to any other switch in the network.

Using the topology map 448, the configuration diagnostic tool 420 identifies a correct logical layer configuration for the network. In one implementation, the configuration diagnostic tool 420 automatically configures the logical layer network settings 450 (IP subnet and VLANs) of the clustered network 400 to match those of the identified correct logical layer configuration. For example, the configuration diagnostic tool assigns a first IP subnet (10.71.1.x/24) and VLAN (711) to all adapters coupled to switch1 and a second IP subnet (10.71.2.x/24) and VLAN (712) to all adapters coupled to switch2.

In other implementations, the configuration diagnostic tool 420 uses the identified correct logical layer configuration to verify correctness of an existing logical layer configuration. This may be the case when, for example, the user self-configures the IP subnets and VLANs or when the system is designed to auto-populate these values, assuming the user will physically configure the network in a given way (which may or may not match the actual physical configuration created by the user, as illustrated by the topology map 448.

Figure 5:
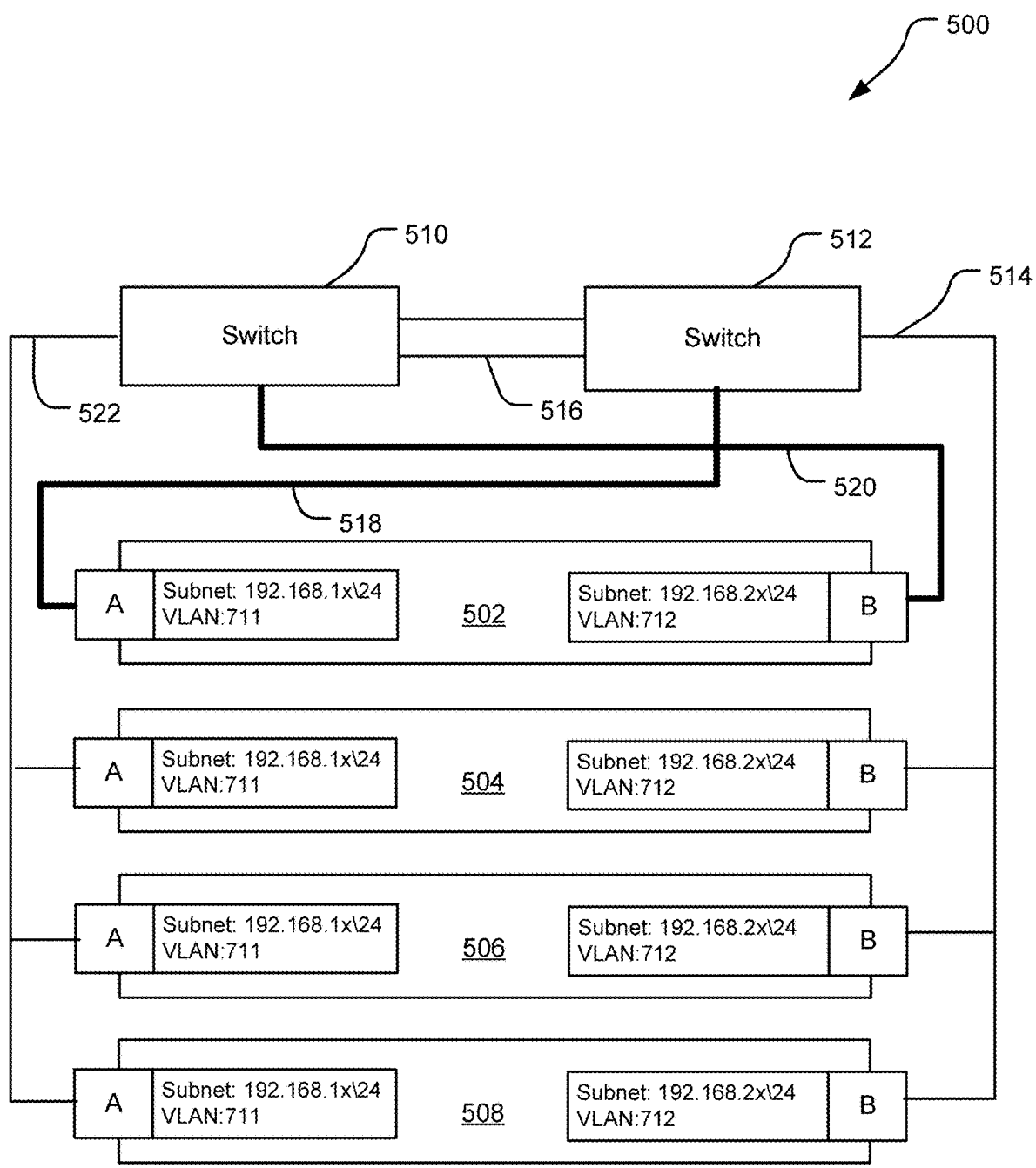
FIG. 5 illustrates an example physical network topology map that has been generated by a node in a clustered network system in accordance with the topology map generation operations that are described above with respect to any of FIG. 1-4.

FIG. 5 illustrates an example physical network topology map 500 that has been generated by a node in a clustered network system in accordance with the topology map generation operations that are described above with respect to any of FIG. 1-4. The physical network topology map 500 includes four nodes 502, 504, 506, and 508, each of which have two network adapters (labeled A and B). Connectivity between the adapters A and B of each of the nodes 502, 504, 506, and 508 and the switches 510 and 512 is illustrated in the topology map 500 by connectivity paths 514, 518, 520, 522.

According to one implementation, a configuration diagnostic tool (as described with respect to any of FIGS. 1, 2A, 2C, 4A, and 4C) retrieves existing logical layer configuration settings for the network and layers these settings onto the topology map 500. With this layering, correctness of the configuration can now be assessed.

With the logical layering added to the topology map 500, an incorrect configuration can be readily diagnosed. As described above, a correct switched network topology ensures that all adapters connected to a same switch share a same IP Subnet and VLAN. In the illustrated scenario, however, adapter A on node 502 is connected to the switch 512 and has a different IP subnet and VLAN than the other adapters connected to the switch 512. Likewise, adapter B on node 502 is connected to the switch 510 but has a different IP subnet and VLAN than the other adapters connected to the switch 510.

Due to the incorrect IP subnet and VLAN assignments on the node 502, all traffic arriving at the node 502 must traverse an interlink 516 between the two switches. To arrive at the A-side adapter on the node 502, other A-side traffic traverses consecutively through the switch 510, the switch 512, and along the path 518. Likewise, to arrive at the B-side adapter on the node 502, other B-side traffic traverses consecutively through the switch 512, the switch 510, and along the path 520. Depending on other system characteristics, this may lead to different types of performance degradation. By nature, the interlink 516 is a chokepoint that is not intended for regular high-speed traffic. If the interlink 516 is not configured to pass this traffic between the switches 510 and 512, this scenario causes a partition that effectively prevents traffic from reaching the node 502. Even if the interlink 516 is configured to pass this traffic between the switches 510 and 512, traffic travel through the interlink 516 increases system latencies and packet loss because the system performs more packet forwarding.

In the topology map shown (with the crossed paths 518 and 520), it easy to see which node is misconfigured. However, to be able to generate the topology map 500 in this way, the existing logical layer configurations may be first added to a table in a configuration data repository that is shared by all nodes (such as the table shown in the configuration data repository 438 of FIG. 4C). In the illustrated scenario, the table would reflect four adapters coupled to the same switch with three of the four adapters sharing a common IP Subnet and VLAN, and the fourth adapter having a different IP Subnet and VLAN. In this case, the configuration diagnostic tool may employ the concept of "majority voting", which is a decision rule that selects the alternative that is most commonly used, to determine which of the four adapters is misconfigured (e.g., because three adapters coupled to the switch 510 are configured identically, this suggests that the fourth adapter coupled to the switch 510 is the one that is misconfigured).

Responsive to diagnosing the misconfiguration illustrated in FIG. 5, the configuration diagnostic tool performs an action to initiate correction of the identified misconfiguration. In the illustrated scenario, the misconfiguration can be corrected either by software (e.g., by updating logical layer configurations) or physically by a user. For example, in the former scenario, the configuration diagnostic tool may automatically correct the diagnosed misconfiguration by swapping the subnet/VLAN assignments on the A-side and B-side of the node 502. In the latter scenario, the configuration diagnostic tool may present the generated topology map 500 to the user and informs the user that cables corresponding to paths 518 and 520 need to be swapped such that the A-side of the node 502 connects to switch 510 and the B-side of the node 502 connects to the switch 512.

Figure 6:
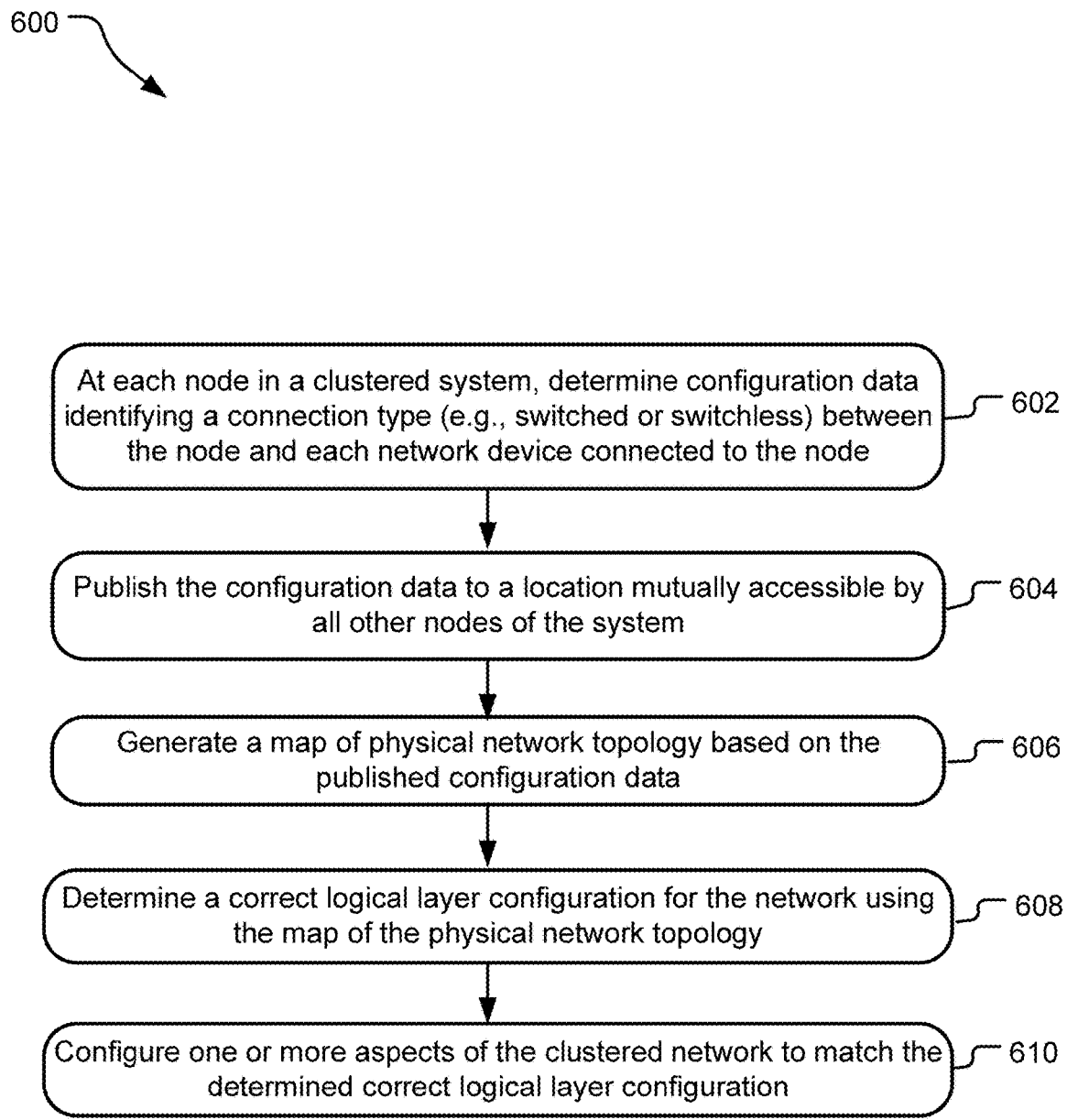
FIG. 6 illustrates example operations for constructing a physical network topology map of a clustered network and for using the physical network topology map to ensure that a logical layer of the system is configured correctly.

FIG. 6 illustrates example operations 600 for constructing a physical network topology map of a clustered network and for using the physical network topology map to ensure that a logical layer of the system is configured correctly. A data collection operation 602 determines configuration data for each node in a clustered network. The configuration data describes the local mapping of the node by identifying devices connected to the node and whether a connection to each of the connected devices is switched or switchless. According to one implementation, the data collection operation 602 is performed locally on each node in the clustered network and according to the configuration data determination operations generally described with respect to any of FIG. 2A-2B, 3, or 4A-4B.

A publishing operation 604 publishes the configuration data determined at each of the nodes to a location, such as to a shared database or exportable log file that is mutually accessible by all other nodes of the system. A map generation operation 606 generates a map of physical network topology based on the published configuration data. According to one implementation, the map of physical network topology identifies each of the nodes in the clustered network and the connectivity channels between the multiple nodes (e.g., including switches in switched systems).

A determination operation 608 determines a correct logical layer configuration for the network using the map of the physical network topology (where a "correct" logical layer configuration for a switched network topology is one that ensures that all adapters connected to a same switch share a same IP subnet and VLAN and where a "correct" logical layer configuration for a switchless network topology is one that ensures a unique subnet/VLAN pair of each different pair of nodes that are in communication with one another).

A configuration operation 610 configures one or more aspects of the clustered network to match the determined correct logical layer configuration. For example, the configuration operation 610 may automatically configure the entire logical layer of the network to match the determined correct logical layer connector. Alternatively, the configuration operation 610 may correct one or more logical layer settings to match that of the determined correct logical layer configuration.

In still another implementation, the operations 600 further provides for presenting a suggested network alteration to the existing network to a user. For example, the suggested alteration may specify a user action that, if performed, is effective to either alter the existing physical network configuration to be correct in view of a currently-existing logical layer configuration or—alternatively—to alter the existing logical layer configuration to be correct in view of the existing physical configuration.

The following summary provides a non-exhaustive set of illustrative examples of the technology set forth herein.

(A1) An example method for configuring a network includes determining, at each node of multiple nodes in the clustered network, a physical network topology. Determining the physical network topology includes determining configuration data identifying a connection type between a particular node and each device connected to the particular node, where the connection type is either a switched or a switchless connection. Determining the physical network topology further includes publishing the configuration data to a location mutually accessible by the multiple nodes in the clustered network. The method further comprises generating, with a processor, a map of the physical network topology of the clustered network based on the configuration data published by the multiple nodes, where the map of the physical network topology identifies the multiple nodes and existing connectivity channels between the multiple nodes in the clustered network. The method still further comprises determining a correct logical layer configuration for the clustered network using the map of the physical network topology and configuring an aspect of the clustered network to match the correct logical layer configuration.

The method of A1 is advantageous because it facilitates auto-configuration of logical aspects (IP subnets and VLANs) of a clustered network where the auto-configured aspects are based on detected physical aspects of the network and are therefore guaranteed to be "correct" in the sense that the auto-configured aspects ensure higher-performance than the performance resulting from other logical configurations. Additionally, the method of A1 provides a simple way to diagnose misconfigurations within the network that are independent of subjective choices that a user may in deciding how to physically connect (cable up) a clustered network system.

(A2) In another example method according to any preceding method, the network is a switched network, and the correct logical layer is one in which each network interface controller (NIC) connected to a same switch is configured to share a common internet protocol (IP) subnet and virtual local area network (VLAN).

(A3) In still another example method according to any preceding method, the network is a switched network and the correct logical layer configuration is one in which each different pair of connected network interface controllers (NICs) is configured to communicate using an IP Subnet and VLAN pair that is unique within the network.

The methods of A2 and A3 are advantageous because they allows a system node to determine whether a given logical layer network is a highest-performing configuration for the given type of network (switched or switchless).

(A4) In still another example method of any preceding method, determining the configuration data further comprises receiving, from each device connected to the node, media access control (MAC) addresses on each device; intercepting a link layer discover protocol (LLDP) frame from each device connected to the particular node, the LLDP frame including a port identifier (ID); and determining that a select device is a remote node and that a switchless connection exists between the remote node and the particular node based on the port ID in the LLDP frame of the select device matching one of the MAC addresses.

(A5) In still another example method of any preceding method, determining the configuration data further comprises receiving, from each device connected to the node, MAC addresses on the device; intercepting a LLDP frame from each device connected to the particular node, the LLDP frame including a port ID; and determining that a select device is a switch based on the port ID in the LLDP frame of the select device not matching any of the MAC addresses.

The methods of A4 and A5 are advantageous because they allow a node to determine whether its connections to other nodes are switched (through a switch) or switchless—an essential building block needed to generate a complete map of physical network topology.

(A6) In yet still another example method of any preceding method, the LLDP frame received from each of the one or more other devices identifies a chassis ID and generating the map of physical network topology further includes using the chassis ID associated with each of the one or more other devices to identify a subset of network nodes coupled to a same switch.

The method of A6 is advantageous because it provides operations for determining further information to include in a map of physical network topology that may be helpful in assessing the accuracy of existing logical layer configurations of the same network.

(A7) In still yet another example method of any preceding method, configuring the one or more aspects of the network to match the determined correct logical layer configuration further comprises detecting a misconfiguration and altering a logical layer network setting to correct the detected misconfiguration. The method of A7 is advantageous because it may save a user time troubleshooting and reduce user reliance on tech support specialists in configuring clustered networks.

(A8) In yet another example method of any preceding method, configuring the one or more aspects of the network to match the determined correct logical layer configuration further comprises automatically configurating IP subnets and VLANS to match the determined correct logical layer configuration.

The method of A8 is advantageous because the correct (e.g., highest-performing) logical configuration can be determined and auto-implemented in a clustered system without requesting user input, regardless of how the user chooses to configure the physical aspects of the network.

In another aspect, some implementations include a system for configuring a clustered network based on a detected physical network topology of the clustered network. The system includes a processor and processor-executable instructions configured to perform any of the methods described above (e.g., methods A1-A8).

In still another aspect, some implementations include computer-readable instructions executable to configure aspects of a clustered network based on a detected physical network topology of the clusters network. The computer-readable instructions are executable to perform any of the methods described above (e.g., methods A1-A8).

Figure 7:
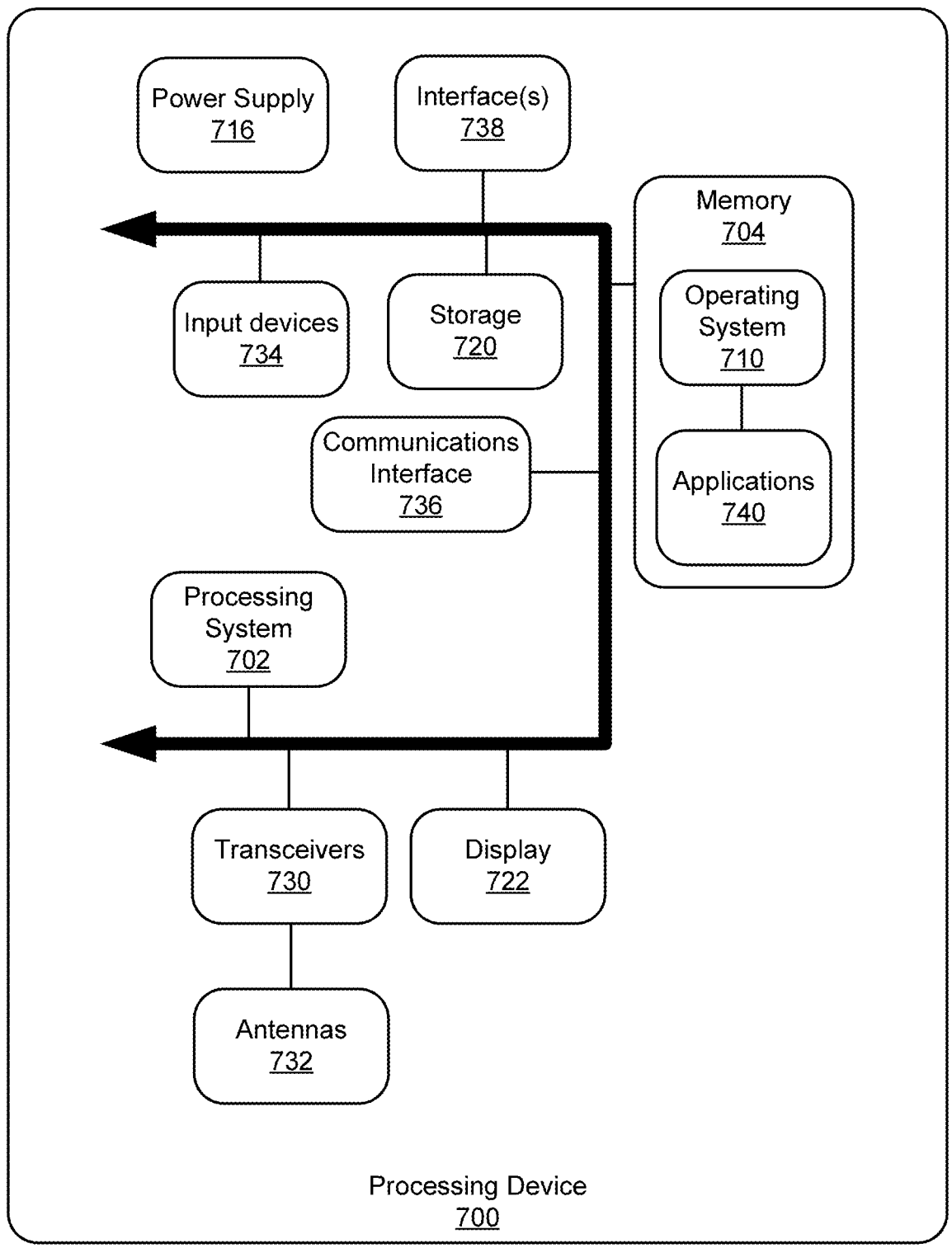
FIG. 7 illustrates an example schematic of a processing device that may be suitable for implementing aspects of the disclosed technology.

FIG. 7 illustrates an example schematic of a processing device 700 that may be suitable for implementing aspects of the disclosed technology. The processing device 700 includes a processing system 702 (e.g., a CPU and a USB controller controller), memory 704, a display 722, and other interfaces 738 (e.g., buttons). The memory 704 generally includes both volatile memory (e.g., RAM) and non-volatile memory (e.g., flash memory). An operating system 710, such as the Microsoft Windows® operating system, the Microsoft Windows® Phone operating system or a specific operating system designed for a gaming device, resides in the memory 704 and is executed by the processing system 702, although it should be understood that other operating systems may be employed.

One or more applications 740, such a network topology construction and correction agent (e.g., the network topology construction and correction agent 108 of FIG. 1) are loaded in the memory 704 and executed on the operating system 710 by the processing system 702. Applications 740 may receive input from various input local devices (not shown) such as a microphone, keypad, mouse, stylus, touchpad, joystick, etc. Additionally, the applications 740 may receive input from one or more remote devices, such as remotely-located smart devices, by communicating with such devices over a wired or wireless network using more communication transceivers 730 and an antenna 732 to provide network connectivity (e.g., a mobile phone network, Wi-Fi®, Bluetooth®). The processing device 700 further includes storage 720 and a power supply 716, which is powered by one or more batteries and/or other power sources and which provides power to other components of the processing device 700. The power supply 716 may also be connected to an external power source (not shown) that overrides or recharges the built-in batteries or other power sources.

The processing device 700 may include a variety of tangible computer-readable storage media and intangible computer-readable communication signals. Tangible computer-readable storage can be embodied by any available media that can be accessed by the processing device 700 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 900. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method for configuring a clustered network, the method comprising:
    determining, at each node of multiple nodes in the clustered network, a physical network topology, the determining comprising:
        determining configuration data identifying a connection type between a particular node and each device connected to the particular node, the connection type being a switched or a switchless connection;
        publishing the configuration data to a location mutually accessible by the multiple nodes in the clustered network;
    generating, with a processor, a map of the physical network topology of the clustered network based on the configuration data published by the multiple nodes, the map of the physical network topology identifying the multiple nodes and existing connectivity channels between the multiple nodes in the clustered network;
    determining a correct logical layer configuration for the clustered network using the map of the physical network topology; and
    configuring an aspect of the clustered network to match the correct logical layer configuration.

2. The method of claim 1, wherein the clustered network is a switched network, and wherein the correct logical layer configuration comprises:

each network interface controller (NIC) connected to a same switch is configured to share a common internet protocol (IP) subnet and virtual local area network (VLAN).

3. The method of claim 1, wherein the clustered network is a switched network and wherein the correct logical layer configuration comprises:
   each different pair of connected network interface controllers (NICs) is configured to communicate using an IP Subnet and VLAN pair that is unique within the clustered network.

4. The method of claim 1, wherein determining the configuration data further comprises:
   receiving, from each device connected to the node, media access control (MAC) addresses on each device;
   intercepting a link layer discover protocol (LLDP) frame from each device connected to the particular node, the LLDP frame including a port identifier (ID); and
   determining that a select device is a remote node and that a switchless connection exists between the remote node and the particular node based on the port ID in the LLDP frame of the select device matching one of the MAC addresses.

5. The method of claim 1, wherein determining the configuration data further comprises:
   receiving, from each device connected to the node, MAC addresses on the device;
   intercepting a LLDP frame from each device connected to the particular node, the LLDP frame including a port ID; and
   determining that a select device is a switch based on the port ID in the LLDP frame of the select device not matching any of the MAC addresses.

6. The method of claim 5, wherein the LLDP frame received from each device identifies a chassis ID, and wherein generating the map of the physical network topology further includes using the chassis ID associated with each device to identify a subset of the multiple nodes coupled to a same switch.

7. The method of claim 1, wherein configuring the aspect of the clustered network to match the correct logical layer configuration further comprises:
   detecting a misconfiguration; and
   altering a logical layer network setting to correct the misconfiguration.

8. The method of claim 1, wherein configuring the aspect of the clustered network to match the correct logical layer configuration further comprises:
   configurating IP subnets and VLANs to match the correct logical layer configuration.

9. A system for configuring a clustered network based on a physical network topology of the clustered network, the system comprising:
   multiple nodes;
   an endpoint investigator stored in memory, the endpoint investigator being executable on each of the multiple nodes to:
      determine configuration data for an associated node of the multiple nodes, the configuration data identifying a connection type between the associated node and each device connected to the associated node, the connection type being a switched or a switchless connection; and
      publish the configuration data determined for the associated node to a location mutually accessible by the multiple nodes;
   a topology map generator stored in memory and executable to generate a map of the physical network topology of the clustered network based on the configuration data generated by the multiple nodes, the map of the physical network topology identifying the multiple nodes and existing connectivity channels between the multiple nodes in the clustered network; and
   a configuration diagnostic tool stored in memory and executable to use the map of the physical network topology to:
      determine a correct logical layer configuration for the clustered network; and
      configure an aspect of the clustered network to match the correct logical layer configuration.

10. The system of claim 9, wherein the endpoint investigator determines that the clustered network is a switched network and the correct logical layer configuration is a configuration in which each subset of network interface controllers (NICs) connected to a same switch is configured to share a common internet protocol (IP) subnet and virtual local area network (VLAN).

11. The system of claim 9, wherein the endpoint investigator determines that the clustered network is a switchless network and the correct logical layer configuration is a configuration
   in which each different pair of connected network interface controllers (NICs) is configured to communicate using an IP Subnet and VLAN pair that is unique within the clustered network.

12. The system of claim 9, wherein the endpoint investigator is further executable to:
   receive, from each of the one or more other devices connected to the node, MAC addresses on the device;
   intercept a link layer discover protocol (LLDP) frame from a select device connected to the node, the LLDP frame including a port identifier (ID); and
   responsive to determining that the port ID in the LLDP frame from the select device matches one of the received MAC addresses, determine that the select device is a remote node and that a switchless connection exists between the remote node and the node.

13. The system of claim 12, wherein the endpoint investigator is further executable to determine that the select is a switch rather than a node responsive to determining that the port ID in the LLDP frame of a select device connected to the node does not match any of the MAC addresses received by the node.

14. The system of claim 10, wherein the LLDP frame received from each of the one or more other devices connected to the node identifies a chassis ID and wherein the map of physical network topology connects a subset of nodes sharing the chassis ID to a same switch.

15. The system of claim 9, wherein the configuration diagnostic tool is further executable to use the map of the physical network topology to identify a misconfiguration within the clustered network and to alter a logical layer network setting to correct the identified misconfiguration.

16. The system of claim 9, wherein the configuration diagnostic tool is further executable to:
   automatically configure IP subnets and VLANs of the multiple nodes to match the determined correct logical layer configuration.

17. A tangible computer-readable storage media encoding computer-executable instructions for executing a computer process, the computer process comprising:
   at each node of multiple nodes in a clustered network:

accessing configuration data identifying a connection type between the node and each one or more other devices connected to the node, the connection type being either a switched or switchless connection;

publishing the configuration data determined at each of the multiple nodes to a location mutually accessible by other nodes in the clustered network;

generating a map of physical network topology of the clustered network based on the published configuration data generated by the multiple nodes, the map of physical network topology identifying the multiple nodes and existing connectivity channels between the multiple nodes in the clustered network;

using the map of the physical network topology to determine a correct complete configuration for the clustered network; and present a suggested alteration to an existing network configuration to a user, the suggested alteration being effective to alter the existing network configuration to match the determined correct configuration for the clustered network.

18. The tangible computer-readable storage media of claim 17, wherein using the map of the physical network topology to determine a correct logical layer configuration further comprises:

determining that the clustered network is a switched network and verifying that each subset of network interface controllers (NICs) connected to a same switch is configured to share a common internet protocol (IP) subnet and virtual local area network (VLAN).

19. The tangible computer-readable storage media of claim 17, wherein using the map of the physical network topology to verify the clustered network is configured correctly further comprises:

determining that the clustered network is a switchless network and verifying that each different pair of connected network interface controllers (NICs) is configured to communicate using an IP Subnet and VLAN pair that is unique within the clustered network.

20. The tangible computer-readable storage media of claim 17, wherein determining the configuration data further comprises:

receiving, from each of the one or more other devices connected to the node, MAC addresses on the device;

intercepting a link layer discover protocol (LLDP) frame from a select device connected to the node, the LLDP frame including a port identifier (ID);

determining that the select device is a remote node and that a switchless connection exists between the remote node and the node responsive to determining that the port ID in the LLDP frame of the select device matches one of the received MAC addresses; and determining that the select device is a switch rather than a node responsive to determining that the port ID in the LLDP frame of the select device does not match any of the received MAC addresses.

* * * * *